United States Patent
Lin et al.

(10) Patent No.: US 7,092,377 B2
(45) Date of Patent: Aug. 15, 2006

(54) BI-DIRECTIONAL TIME SLOT ESTIMATOR FOR WIRELESS COMMUNICATION SYSTEM

(75) Inventors: Jingdong Lin, Irvine, CA (US); Tong Zhao, Stanford, CA (US)

(73) Assignee: Spreadtrum Communications Corporation, Sunnyvale, CA (US)

( * ) Notice: Subject to any disclaimer, the term of this patent is extended or adjusted under 35 U.S.C. 154(b) by 1038 days.

(21) Appl. No.: 10/131,928

(22) Filed: Apr. 24, 2002

(65) Prior Publication Data

US 2003/0202493 A1    Oct. 30, 2003

(51) Int. Cl.
*H04J 3/06* (2006.01)
*H04L 7/00* (2006.01)

(52) U.S. Cl. .................... 370/350; 370/458; 370/503; 375/354

(58) Field of Classification Search ............... 340/3.2, 340/3.21
See application file for complete search history.

(56) References Cited

U.S. PATENT DOCUMENTS

| | | | | |
|---|---|---|---|---|
| 5,724,657 | A | * | 3/1998 | Lin et al. ............... 455/423 |
| 5,761,250 | A | * | 6/1998 | Lin ........................ 375/344 |
| 6,333,953 | B1 | * | 12/2001 | Bottomley et al. ...... 375/316 |
| 6,356,608 | B1 | * | 3/2002 | Atarius .................. 375/362 |
| 2003/0189978 | A1 | * | 10/2003 | Lin et al. ................ 375/224 |

* cited by examiner

*Primary Examiner*—Hassan Kizou
*Assistant Examiner*—Brian Roberts
(74) *Attorney, Agent, or Firm*—Perkins Coie LLP

(57) ABSTRACT

A method of determining a time slot timing based upon an input sequence r(n) is disclosed. The method comprises using a frequency correction channel detector to determine a first time slot end time based upon the input sequence r(n). Then, the frequency correction channel detector is used to determine a second time slot end time based upon an order reversed input sequence r(n). A time slot midpoint is calculated as the average of the first time slot end time and second time slot end time. The time slot midpoint is then used to estimate the time slot timing.

15 Claims, 4 Drawing Sheets

BI-DIRECTIONAL TIME SLOT ESTIMATOR FOR WIRELESS COMMUNICATION SYSTEM

TECHNICAL FIELD

The present invention relates to a circuit and method for estimating the timing of a time slot within a frame in a time division multiple access (TDMA) wireless communications system, and more particularly, to a system and method for estimating the timing by use of bi-directional averaging.

BACKGROUND

The Global System for Mobile Communications (GSM) is a cellular telecommunications system that is used throughout the world. In one specific implementation, GSM utilizes two bands of 25 MHz, which have been set aside for system use. The 890–915 MHz band is used for subscriber to base station transmissions (reverse link), and the 935–960 MHz band is used for base station to subscriber transmissions (forward link). However, it can be appreciated that other bandwidths and frequency ranges may also be used to implement the GSM protocol. The GSM protocol uses frequency division duplexing and time division multiple access (TDMA) techniques to provide base stations with simultaneous access to multiple users. Transmissions on both the forward and reverse link are made at a channel data rate of approximately 270 Kbps, using binary Gaussian minimum shift key (GMSK) modulation.

In the GSM protocol, there are traffic channels and control channels. The traffic channels carry the digitized voice or user data. The control channels include what is known as the frequency correction channel (FCCH), which is a special data burst which occupies time slot 0 for the very first GSM frame and is repeated every ten frames within a control channel multiframe. The FCCH allows each subscriber unit to synchronize its internal frequency (local oscillator) to the exact frequency of the base station.

Typically, the frequency correction channel is a single tone with a nominal frequency within a given frequency range, and repeats every 50 bursts. However, factors such as strong Gaussian noise, strong co-channel or adjacent channel interference, and severe fading, have made a typical methods quite unreliable and time consuming. The net effect from the user's perspective thus becomes long establishing periods.

Another control channel is the synchronization control channel (SCH), which is typically broadcast in timeslot zero (TS 0) of the frame immediately following the FCCH frame and is used to identify the serving base station while allowing each mobile unit to frame synchronize with the base station. The frame number (FN) is sent with the base station identity code (BSIC) during the SCH burst. The BSIC is uniquely assigned to each base station in a GSM system.

In order to decode the SCH data burst, it is generally required to estimate the time slot timing of the SCH data burst. A rough time slot estimate is required to position the SCH data burst for decoding. More exact frame timing can be achieved after the SCH burst has been decoded by examining the channel peak acquisition. As long as the error of the rough time slot timing is within a certain limit, the handshake process between the base station and the mobile unit can be successful. However, if the error in the rough timing estimate is larger than what the SCH burst decoding process can handle, then the SCH burst decoding will fail.

DETAILED DESCRIPTION

The present invention describes a method and apparatus for estimating time slot timing in a mobile telecommunications system. In the following description, numerous specific details are provided to provide a thorough understanding of the embodiments of the invention. One skilled in the relevant art will recognize, however, that the invention can be practiced without one or more of the specific details, or with other methods, components, etc. In other instances, well-known structures or operations are not shown or described in detail to avoid obscuring aspects of various embodiments of the invention.

Reference throughout the specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout the specification are not necessarily all referring to the same embodiment. Furthermore, the particular features, structures, or characteristics may be combined in any suitable manner in one or more embodiments.

Further, although the present invention is described in terms of the GSM protocol, the system and method of the present invention can equally be applicable to any telecommunications system that utilizes frames. Thus, the description below is but one embodiment of the present invention directed to estimating time slot timing in the GSM protocol. Further, although a time slot timing is estimated using the present invention, based upon the time slot timing, frame timing information can also be derived as detailed below.

1. Overview

Figure 1:
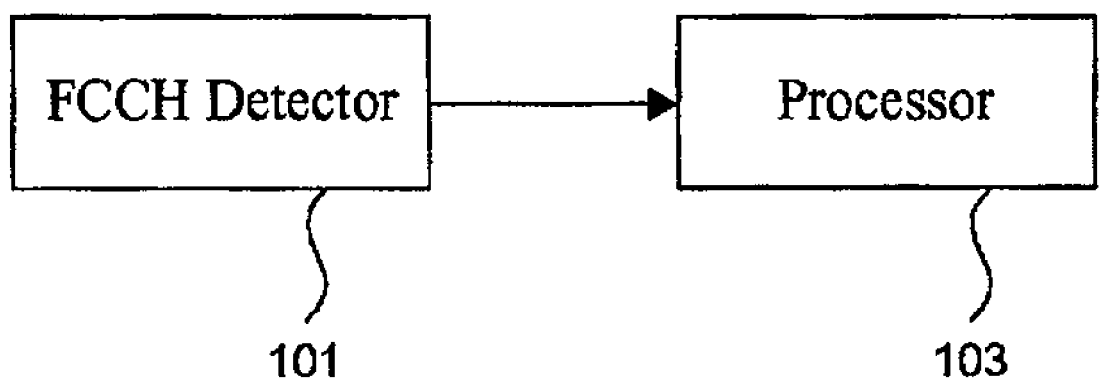
FIG. 1 is a block diagram illustrating a time slot timing estimator of the present invention.

Turning to FIG. 1, the apparatus of the present invention includes a FCCH detector 101 and a processor 103. The FCCH detector 101 can be one of many types. Some FCCH detectors 101 output a power ratio that is indicative of the presence of the FCCH tone. Other FCCH detectors 101 simply output timing information indicative of the begin and end times of the FCCH time slot. Still other FCCH detectors 101 output only the end time of the FCCH time slot. From the end time, the begin time of the FCCH time slot can be derived based upon knowledge of the time slot duration. In any event, the FCCH detector 101 will receive as its input a sequence of complex samples r(n). The present invention is suitable for use with any of these types of FCCH detectors 101, as well as other types of FCCH detectors. Each of the types of FCCH detectors 101 described above will be described in conjunction with the present invention below.

2. FCCH Detector Based on Power Ratio

In one embodiment, the FCCH detector 101 provides a data sequence, which when analyzed properly, can give an indication as to when the beginning of the FCCH time slot occurs and the ending of the FCCH time slot occurs. The FCCH detector 101 may be of the form as described in our co-pending application entitled "Phase Difference Based Frequency Correction Channel Detector for Wireless Communication System" to Lin et al. filed Apr. 9, 2002 and accorded Ser. No. 10/119,409, which is herein incorporated by reference in its entirety.

Figure 2:
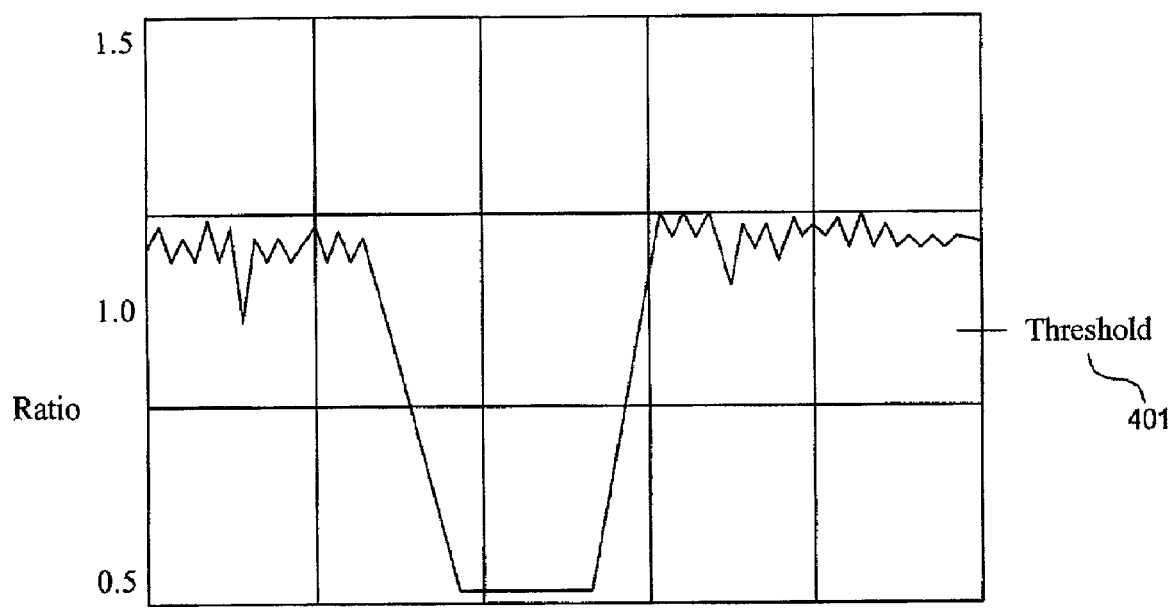
FIG. 2 is a graph illustrating one example of the data power ratio generated by the system of FIG. 1.

In one embodiment, the FCCH detector 101 determines a power ratio and provides an output as exemplified in FIG. 2. The ratio t(n) is charted as a function of sample index n. Typically, the ratio t(n) is near one until the FCCH tone is detected, at which time to ratio t(n) drops significantly, approaching zero. When the FCCH tone is complete, the ratio t(n) then rises quickly, approaching one. It can be appreciated that the graph of FIG. 2 is just but one example of a ratio t(n). Other transmission conditions will affect the precise nature of t(n), but the general shape of the ratio t(n) will be the same.

In general, it has been found that the rising edge of the ratio t(n) is sharper than the falling edge. This indicates that the rising edge has a much smaller variance. Thus, the rising edge is more suitable for estimating the time slot boundary. The predetermined threshold is denoted by reference numeral 401.

Assuming that the time index that the ratio t(n) exceeds the threshold 401 is denoted as $T_{rise}$, the beginning of the time slot carrying the FCCH data burst can be estimated as:

$$T_{begin} = T_{rise} - D - \text{TimeSlotWidth}$$

where D is the detection delay and the factor TimeSlotWidth is the nominal duration of the time slot. D is related to several parameters used in the detection apparatus and will also be affected by fading, noise, and channel conditions. It can be appreciated that the above is but one embodiment of the invention which uses a FCCH detector 101 that outputs data based upon a power ratio.

Figure 3:
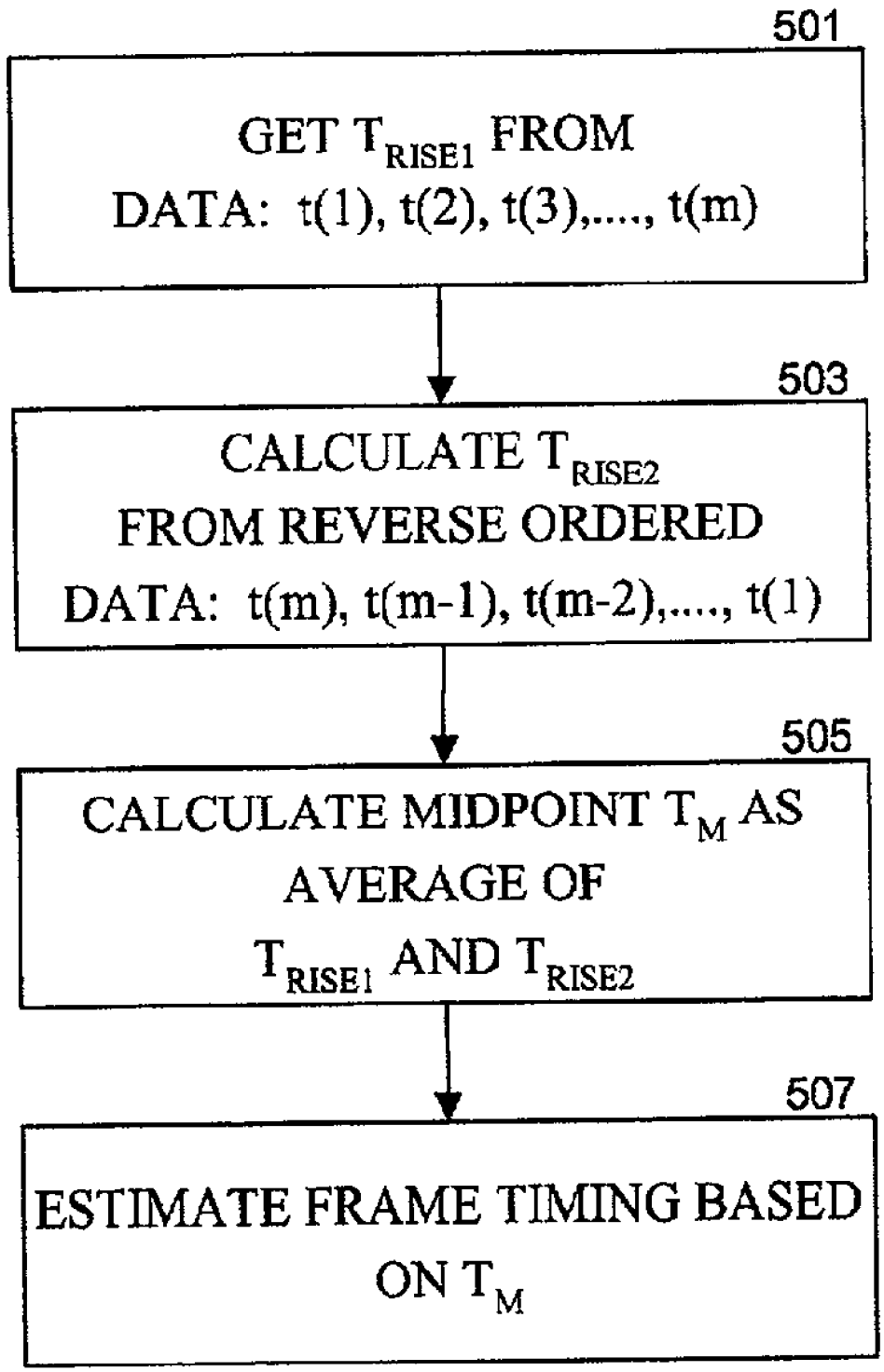
FIG. 3 is a flow diagram illustrating the method of estimating time slot timing of the present invention.

In order to improve the time slot timing estimation, according to the present invention, a bi-directional approach is disclosed. The method is generally shown in FIG. 3. First, at box 501, the parameter $T_{rise1}$ is determined by processing the data from the FCCH detector 101 which is termed t(1), t(2), ... t(M). The parameter $T_{rise1}$ is the time index upon which the FCCH detector 101 detects the rising edge of the end of the time slot. Next, at box 503, the parameter $T_{rise2}$ is determined by processing the data in reverse order, e.g., t(M), t(M−1), ... t(1). Again, the parameter $T_{rise2}$ is the time index upon which the reverse ordered data indicates that the rising edge of the end of the time slot occurs. Then, at box 505, the middle point of the time slot 0, which carries the FCCH tone can be determined by:

$$T_m = (T_{rise1} + T_{rise2})/2$$

Once the middle point of the time slot has been determined, at box 507, the time slot timing and/or the frame timing can be easily extracted by based upon the value of $T_m$, since the time slot is centered about the middle point of the time $T_m$.

Further, if desired, the frame timing can also be determined. Because the FCCH data burst is in time slot 0 in the GSM protocol, the beginning of time slot 0 is the same as the beginning of the frame. The end of the frame is simply the ending time of time slot 0 plus seven additional nominal time slot durations. This is because a frame in the GSM protocol consists of eight time slots.

3. FCCH Detector Outputting Begin and End Time

Figure 4:
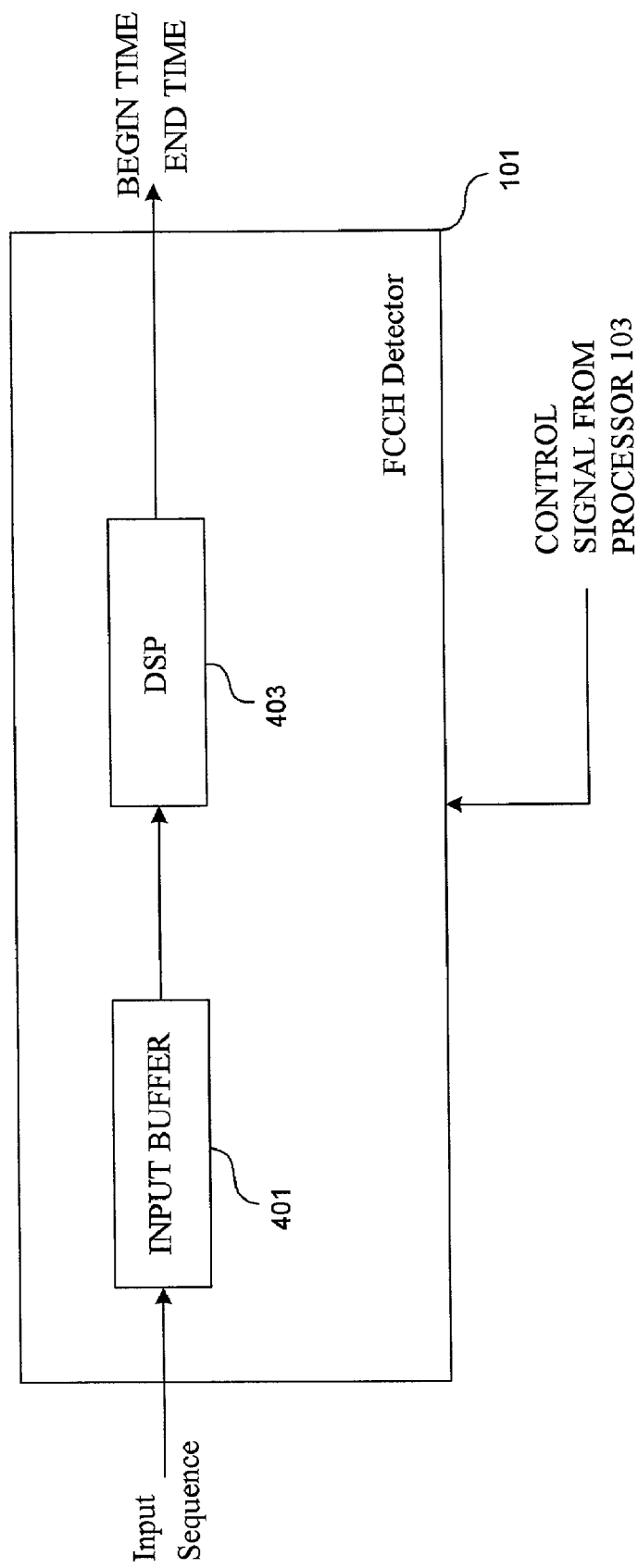
FIG. 4 is a block diagram illustrating a FCCH detector suitable for use with the present invention.

In another embodiment, the FCCH detector 101 simply outputs the begin and end time of the FCCH time slot. These types of detectors receive an input sequence r(n), perform some type of analysis and output a begin time and an end time. As seen in FIG. 4, typically, these types of FCCH detectors include an input buffer 401 and a digital signal processor (DSP) 403. The DSP 403 is operative to execute a set of predetermined instructions capable of analyzing the input sequence stored on the input buffer 401 and determining the begin time and end time. The end time produced by the FCCH detector 101 is received by the processor 103 of FIG. 1 and designated as $T_{rise1}$.

In accordance with one embodiment of the present invention, a control signal is transmitted by the processor 103 and received by the FCCH detector 101 of FIG. 4. The control signal instructs the FCCH detector 101 to perform a second analysis of the input sequence r(n) stored in the input buffer 401. However, during the second analysis, the input sequence is reversed. Thus, if the input sequence during the first analysis is r(1), r(2), ... r(M), where M is the number of samples in the input sequence r(n), then the input sequence during the second analysis is r(M), r(M−1), ..., r(1). This results in an output by the DSP 403 of a second begin time and a second end time. Because the second analysis is of the input sequence in reverse, the second begin time is in fact a "second time slot end time" and the second end time is in fact a "second time slot begin time". The processor 103 receives the second begin time and designates that as $T_{rise2}$. The parameter $T_{rise2}$ is the time index upon which the reverse ordered data indicates that the rising edge of the end of the time slot occurs.

Then, the middle point of the time slot 0, which carries the FCCH tone can be determined by:

$$T_m = (T_{rise1} + T_{rise2})/2$$

Once the middle point of the time slot has been determined, the time slot timing and/or the frame timing can be easily extracted by based upon the value of $T_m$, since the time slot is centered about the middle point of the time $T_m$.

Further, if desired, the frame timing can also be determined. Because the FCCH data burst is in time slot 0 in the GSM protocol, the beginning of time slot 0 is the same as the beginning of the frame. The end of the frame is simply the ending time of time slot 0 plus seven additional nominal time slot durations. This is because a frame in the GSM protocol consists of eight time slots.

4. FCCH Detector Outputting End Time

Similar to the FCCH detectors discussed in Section 3 above, another type of FCCH detector simply outputs the end time of the FCCH time slot. The FCCH detector operates substantially the same as the FCCH detector shown in FIG. 4 and described above. However, instead of outputting both a begin time and an end time, only an end time is output during the first analysis and only a begin time (which is really the "second time slot end time") during the reversed data order second analysis.

The end time produced during the first analysis by the FCCH detector 101 is received by the processor 103 of FIG. 1 and designated as $T_{rise1}$. In accordance with one embodiment of the present invention, a control signal is transmitted by the processor 103 and received by the FCCH detector 101 of FIG. 4. The control signal instructs the FCCH detector 101 to perform a second analysis of the input sequence r(n) stored in the input buffer 401. However, during the second analysis, the input sequence is reversed. Thus, if the input sequence during the first analysis is r(1), r(2), ... r(M), where M is the number of samples in the input sequence r(n), then the input sequence during the second analysis is r(M), r(M−1), ..., r(1). This results in an output by the DSP 403 of a second begin time. Because the second analysis is of the input sequence in reverse, the second begin time is in fact an "end time". The processor 103 receives the second begin time and designates that as $T_{rise2}$. The parameter $T_{rise2}$ is the time index upon which the reverse ordered data indicates that the rising edge of the end of the time slot occurs.

Then, the middle point of the time slot 0, which carries the FCCH tone can be determined by:

$$T_m=(T_{rise1}+T_{rise2})/2$$

Once the middle point of the time slot has been determined, the time slot timing and/or the frame timing can be easily extracted by based upon the value of $T_m$, since the time slot is centered about the middle point of the time $T_m$.

Further, if desired, the frame timing can also be determined. Because the FCCH data burst is in time slot 0 in the GSM protocol, the beginning of time slot 0 is the same as the beginning of the frame. The end of the frame is simply the ending time of time slot 0 plus seven additional nominal time slot durations. This is because a frame in the GSM protocol consists of eight time slots.

In a more general sense, the method of the present invention can be used. FCCH detectors that output time slot begin time, time slot midpoint, or other time slot information may also be used. In such a case, the information output by the FCCH detector can still be used by the present invention. Thus, instead of using the FCCH time slot end time, whatever information output by the FCCH detector can be used in a bi-directional manner. The parameters $T_{rise1}$ and $T_{rise2}$ can be thought of in the more general sense as the output of the FCCH detector calculated in the forward direction and the backward direction, respectively.

5. Conclusion

The method disclosed herein is independent of the parameter selections for the detection circuitry. Further, the method is less related to negative factors, such as noise, fading and channel expansion. Thus, the method disclosed herein is more stable.

Further, in one application, once the time slot timing for the time slot carrying the FCCH data burst has been estimated, the approximating time slot timing for the SCH data burst can be estimated. Typically, in the GSM protocol, the SCH data burst is carried in time slot 0 in the frame immediately following the FCCH data burst. Thus, the estimated begin time of the SCH data burst is simply the estimated begin time of the FCCH data burst plus a frame duration.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

Thus, the above detailed descriptions of embodiments of the invention are not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while steps are presented in a given order, alternative embodiments may perform routines having steps in a different order. The teachings of the invention provided herein can be applied to other systems, not necessarily the GSM system described herein. These and other changes can be made to the invention in light of the detailed description.

We claim:

1. A method of determining a time slot timing, said method comprising:
   (a) calculating a first rise time based upon data output t(n) provided by a frequency correction channel detector;
   (b) calculating a second rise time based upon the order reversed data of said output data t(n);
   (c) calculating a time slot midpoint as the average of said first rise time and second rise time;
   (d) using said time slot midpoint to estimate the time slot timing.

2. The method of claim 1 wherein said first rise time is the time index upon which said output data t(n) exceeds a predetermined threshold and second rise time is the time index upon which the order reversed data of said output data t(n) exceeds said predetermined theshold.

3. The method of claim 1 wherein said time slot timing is centered around said time slot midpoint.

4. The method of claim 1 further including determining a frame timing estimate based upon said time slot midpoint.

5. An apparatus for determining a time slot timing comprising:
   (a) means for calculating a first rise time based upon data output t(n) provided by a frequency correction channel detector;
   (b) means for calculating a second rise time based upon the order reversed data of said output data t(n);
   (c) means for calculating a time slot midpoint as the average of said first rise time and second rise time;
   (d) means for using said time slot midpoint to estimate the time slot timing.

6. The apparatus of claim 5 wherein said first rise time is the time index upon which said output data t(n) exceeds a predetermined threshold and second rise time is the time index upon which the order reversed data of said output data t(n) exceeds said predetermined theshold.

7. The apparatus of claim 5 wherein said time slot timing is centered around said time slot midpoint.

8. The apparatus of claim 5 further including determining a frame timing estimate based upon said time slot midpoint.

9. A method of determining a time slot timing based upon an input sequence r(n), said method comprising:
   (a) using a frequency correction channel detector to determine a first time slot end time based upon said input sequence r(n);
   (b) using said frequency correction channel detector to determine a second time slot end time based upon an order reversed input sequence r(n);
   (c) calculating a time slot midpoint as the average of said first time slot end time and second time slot end time;
   (d) using said time slot midpoint to estimate the time slot timing.

10. The method of claim 9 wherein said time slot timing is centered around said time slot midpoint.

11. The method of claim 9 further including determining a frame timing estimate based upon said time slot midpoint.

12. An apparatus for determining a time slot timing based upon an input sequence r(n), said apparatus comprising:
   (a) a frequency correction channel detector to determine a first time slot end time based upon said input sequence r(n) and to determine a second time slot end time based upon an order reversed input sequence r(n);
   (b) a processor for calculating a time slot midpoint as the average of said first time slot end time and second time slot end time; and
   (c) means for using said time slot midpoint to estimate the time slot timing.

13. The apparatus of claim 12 wherein said time slot timing is centered around said time slot midpoint.

14. The apparatus of claim 12 further including means for determining a frame timing estimate based upon said time slot midpoint.

15. The apparatus of claim 12 wherein said frequency correction channel detector includes an input buffer and a digital signal processor.

* * * * *